United States Patent
Inoshita et al.

(10) Patent No.: US 12,247,644 B2
(45) Date of Patent: Mar. 11, 2025

(54) SPIRAL ADVANCING AND RETREATING OPERATION DEVICE AND BELT MEMBER FOR TUBULAR TELESCOPIC BODY

(71) Applicant: TOYOTA JIDOSHA KABUSHIKI KAISHA, Aichi-ken (JP)

(72) Inventors: Hirofumi Inoshita, Toyota (JP); Satoshi Kojima, Nissin (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/518,603

(22) Filed: Nov. 24, 2023

(65) Prior Publication Data
US 2024/0209924 A1 Jun. 27, 2024

(30) Foreign Application Priority Data
Dec. 23, 2022 (JP) .................................. 2022-206737

(51) Int. Cl.
*F16H 19/06* (2006.01)
(52) U.S. Cl.
CPC .............. *F16H 19/0622* (2013.01)
(58) Field of Classification Search
CPC . B65H 20/20; F16G 11/12; F16H 2019/0677; F16H 19/0618

USPC ........................................................ 74/89.2
See application file for complete search history.

(56) References Cited

U.S. PATENT DOCUMENTS 7,213,796 B2 * 5/2007 Laforest ................. B66F 11/00
254/89 R

FOREIGN PATENT DOCUMENTS

JP       2007192257 A  *  8/2007
JP       4607772 B2        1/2011

* cited by examiner

*Primary Examiner* — Gregory Robert Weber
(74) *Attorney, Agent, or Firm* — HAUPTMAN HAM, LLP

(57) ABSTRACT

The spiral advancing and retreating operation device forms a tubular telescopic body by spirally wrapping a first belt member and a second belt member around a common axis line in an overlapping manner in a state in which the first belt member and the second belt member are displaced from each other in a direction of the axis line, in which the first belt member includes a first row of engagement protrusions and a second row of engagement protrusions formed of a plurality of engagement protrusions, the second belt member includes a first row of engagement parts and a second row of engagement parts formed of a plurality of engagement parts.

11 Claims, 9 Drawing Sheets

SPIRAL ADVANCING AND RETREATING OPERATION DEVICE AND BELT MEMBER FOR TUBULAR TELESCOPIC BODY

CROSS REFERENCE TO RELATED APPLICATIONS

This application is based upon and claims the benefit of priority from Japanese patent application No. 2022-206737, filed on Dec. 23, 2022, the disclosure of which is incorporated herein in its entirety by reference.

BACKGROUND

The present disclosure relates to a spiral advancing and retreating operation device and a belt member for a tubular telescopic body.

Japanese Patent No. 4607772 discloses a spiral advancing and retreating operation device which constitutes a tubular telescopic body by spirally wrapping a first belt member and a second belt member disposed inside the first belt member in an overlapping manner around a common axis line in a state in which the first belt member and the second belt member are displaced from each other in the direction of the axis line (displaced from each other by half a width).

The first belt member includes a first row of engagement protrusions and a second row of engagement protrusions formed of a plurality of engagement protrusions that are arranged in a longitudinal direction of the first belt member and are convex toward the axis line. On the other hand, the second belt member includes a first row of engagement parts and a second row of engagement parts formed of a plurality of engagement parts arranged in a longitudinal direction of the second belt member. The engagement parts are configured in such a way that conical trapezoidal engagement protrusions can be detachably engaged therewith in a state in which the first belt member and the second belt member are spirally wrapped in the overlapping manner.

SUMMARY

However, regarding the conical trapezoidal engagement protrusions described in Japanese Patent No. 4607772, there is room for improving it by making both rigidity of the tubular telescopic body (load-bearing capacity in the vertical direction) and a wrapping ability (ease of wrapping) of belt members (the first belt member and the second belt member) high. The present disclosure has been made to solve the aforementioned problem, and provides a spiral advancing and retreating operation device and a belt member for a tubular telescopic body capable of making both rigidity of the tubular telescopic body (load-bearing capacity in the vertical direction) and a wrapping ability (ease of wrapping) of belt members (first belt member and second belt member) high.

A spiral advancing and retreating operation device according to the present disclosure is a spiral advancing and retreating operation device forming a tubular telescopic body by spirally wrapping a first belt member and a second belt member disposed inside the first belt member around a common axis line in an overlapping manner in a state in which the first belt member and the second belt member are displaced from each other in a direction of the axis line, in which the first belt member includes a first row of engagement protrusions and a second row of engagement protrusions formed of a plurality of engagement protrusions that are disposed in a longitudinal direction of the first belt member and are convex toward the axis line, the second belt member includes a first row of engagement parts and a second row of engagement parts formed of a plurality of engagement parts disposed in a longitudinal direction of the second belt member, the engagement part is configured in such a way that the engagement protrusions can be detachably engaged therewith in a state in which the first belt member and the second belt member are spirally wrapped in the overlapping manner, and a tilt angle of the engagement protrusions in a cross section of a plane including the direction of the axis line is set to be larger than a tilt angle of the engagement protrusions in a cross section of a plane including a circumferential direction of the tubular telescopic body.

According to the aforementioned configuration, it is possible to make both rigidity of the tubular telescopic body (load-bearing capacity in the vertical direction) and a wrapping ability (ease of wrapping) of belt members (the first belt member and the second belt member) high. This is because the tilt angle of the engagement protrusions in the cross section of the plane including the vertical direction is made larger than the tilt angle of the engagement protrusions in the cross section of the plane including the circumferential direction of the tubular telescopic body.

Further, in the above spiral advancing and retreating operation device, the engagement protrusions may be elliptical trapezoidal protrusions and may be provided in the first belt member in a state in which a long axis of the engagement protrusions is in line with the longitudinal direction of the first belt member.

Further, in the above spiral advancing and retreating operation device, the engagement protrusions may be elliptical trapezoidal protrusions and may be provided in the first belt member in a state in which a long axis of the engagement protrusions is tilted by a predetermined angle with respect to the longitudinal direction of the first belt member.

A belt member for a tubular telescopic body according to the present disclosure is a belt member for a tubular telescopic body that is used as a first belt member of a spiral advancing and retreating operation device, the spiral advancing and retreating operation device forming the tubular telescopic body by spirally wrapping the first belt member and a second belt member disposed inside the first belt member around a common axis line in an overlapping manner in a state in which the first belt member and the second belt member are displaced from each other in a direction of the axis line, in which the first belt member includes a first row of engagement protrusions and a second row of engagement protrusions formed of a plurality of engagement protrusions that are disposed in a longitudinal direction of the first belt member and are convex toward the axis line, and a tilt angle of the engagement protrusions in a cross section of a plane including the direction of the axis line is set to be larger than a tilt angle of the engagement protrusions in a cross section of a plane including a circumferential direction of the tubular telescopic body.

Further, another belt member for a tubular telescopic body according to the present disclosure is a belt member for a tubular telescopic body that is used as a second belt member of a spiral advancing and retreating operation device, the spiral advancing and retreating operation device forming a tubular telescopic body by spirally wrapping a first belt member and the second belt member disposed inside the first belt member around a common axis line in an overlapping manner in a state in which the first belt member and the second belt member are displaced from each other in a direction of the axis line, in which the first belt member includes a first row of engagement protrusions and a second row of engagement protrusions formed of a plurality of engagement protrusions that are disposed in a longitudinal direction of the first belt member and are convex toward the axis line, the second belt member includes a first row of engagement parts and a second row of engagement parts formed of a plurality of engagement parts disposed in a longitudinal direction of the second belt member, the engagement part is configured in such a way that the engagement protrusions can be detachably engaged therewith in a state in which the first belt member and the second belt member are spirally wrapped in the overlapping manner, and a tilt angle of the engagement protrusions in a cross section of a plane including the direction of the axis line is set to be larger than a tilt angle of the engagement protrusions in a cross section of a plane including a circumferential direction of the tubular telescopic body.

According to the present disclosure, it is possible to provide a spiral advancing and retreating operation device and a belt member for a tubular telescopic body capable of making both rigidity of a tubular telescopic body (load-bearing capacity in the vertical direction) and a wrapping ability (ease of wrapping) of belt members (a first belt member and a second belt member) high.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Reference Example

A telescopic device 60 (spiral advancing and retreating operation device) of a reference example will be described with reference to FIGS. 1 to 3.

Figure 1:
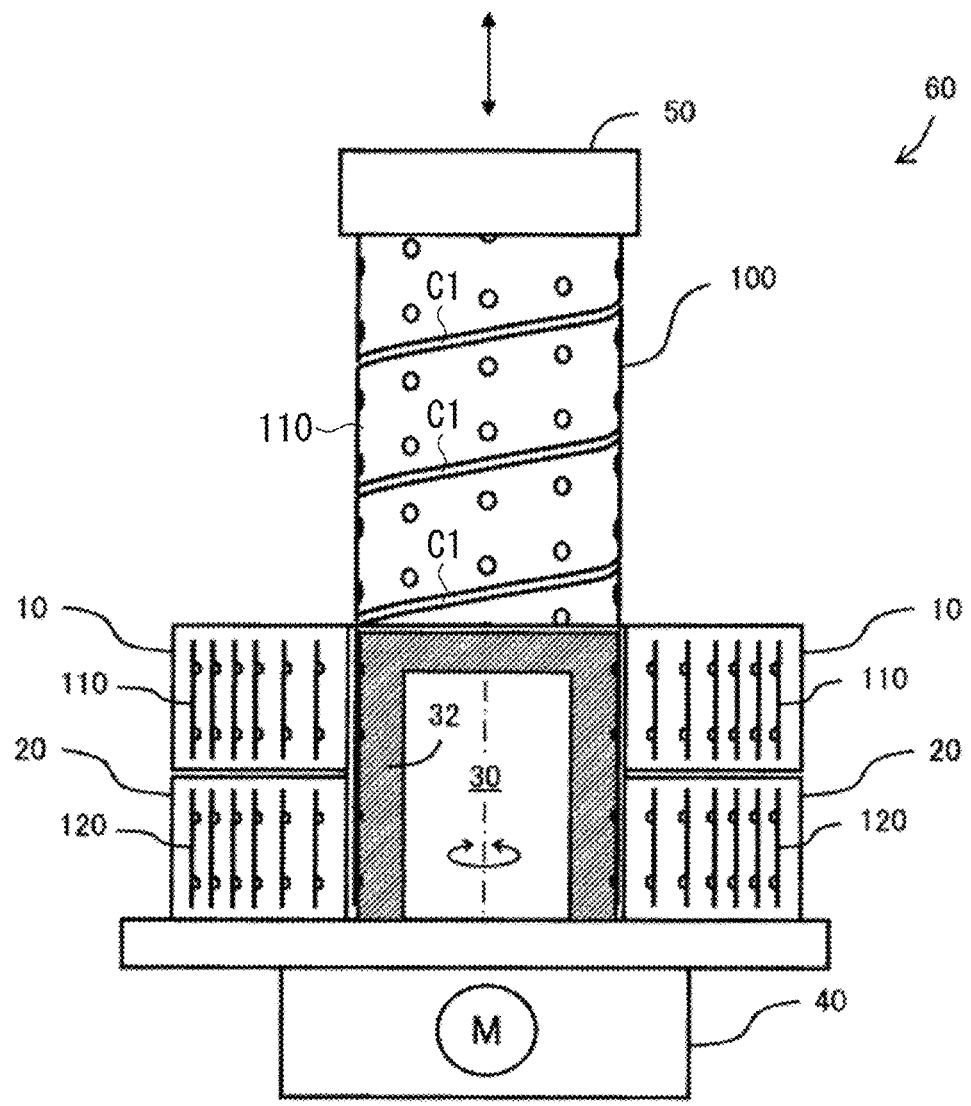
FIG. 1 is an explanatory view showing a configuration of a telescopic device including a spirally wrapped telescopic shaft.

FIG. 1 is an explanatory view showing a configuration of the telescopic device 60 including a spirally wrapped telescopic shaft. The telescopic device 60 of this reference example includes a spirally wrapped telescopic shaft 100 formed by spirally wrapping two belt members 110 and 120, a first accommodating part 10 accommodating the first belt member 110, a second accommodating part 20 accommodating the second belt member 120, a guide part 30 guiding the two belt members 110 and 120 and spirally wrapping them, a drive part 40 rotating a guide member 32 of the guide part 30, and a cap part 50 attached to the tip of the spirally wrapped telescopic shaft 100. As the guide member 32 is driven by the drive part 40 and rotates in one direction, the two belt members 110 and 120 are guided by the guide member 32 and spirally wrapped, and the spirally wrapped telescopic shaft 100 extends upward in FIG. 1. As the guide member 32 rotates in the opposite direction, the wrapping of the two belt members 110 and 120 is released, the two belt members 110 and 120 are accommodated in the respective accommodating parts 10 and 20, and the spirally wrapped telescopic shaft 100 is shortened. Instead of rotating the guide member 32, the spirally wrapped telescopic shaft 100 itself may be rotated to expand or contract the spirally wrapped telescopic shaft 100. The belt members 110 and 120 may be formed of metal (for example, a metal having spring properties, such as spring stainless steel). The belt members 110 and 120 may be formed of other materials such as deformable resin.

Figure 2:
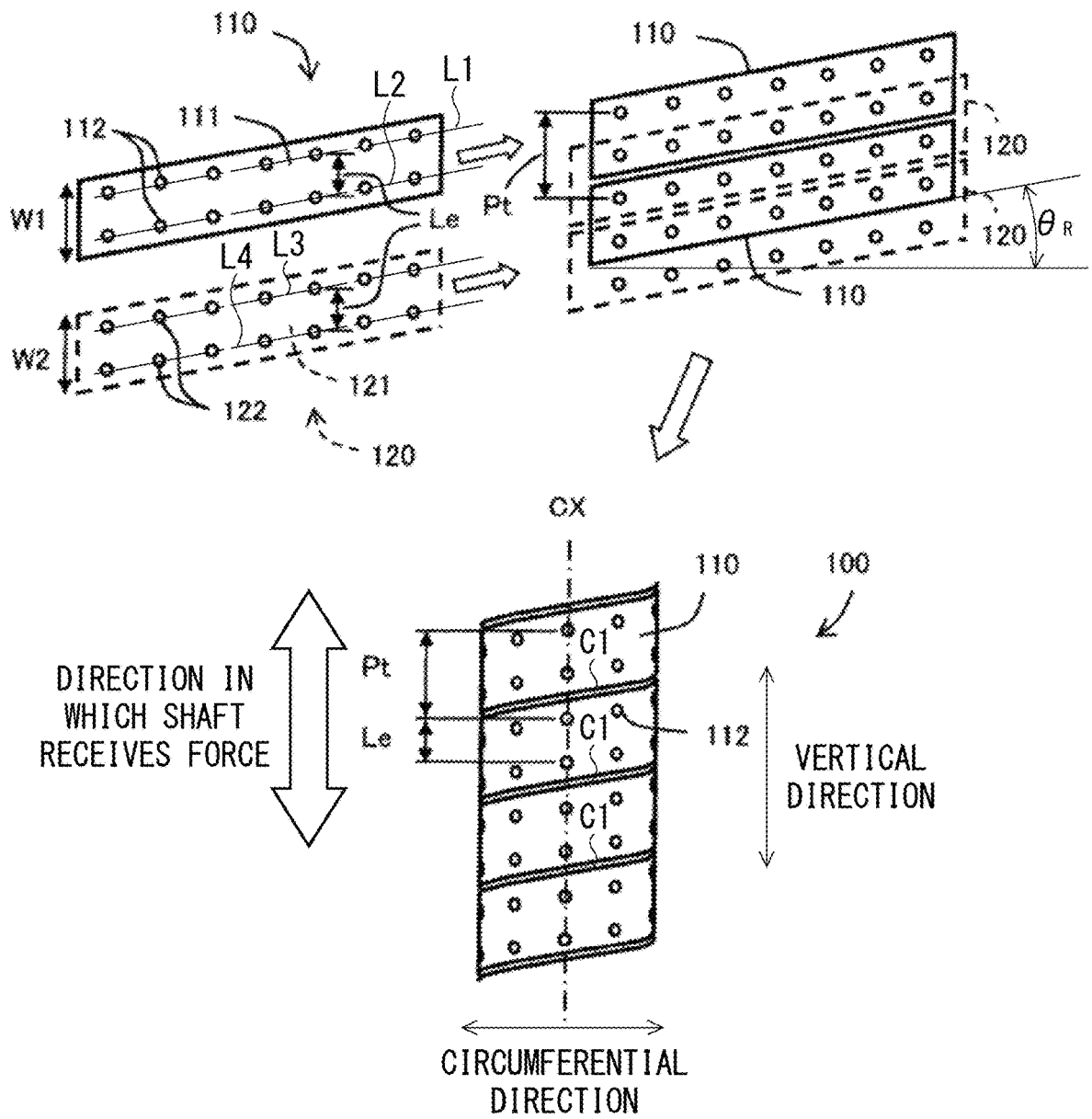
FIG. 2 is an explanatory view showing a state in which the spirally wrapped telescopic shaft is formed.

FIG. 2 is an explanatory view showing a state in which the spirally wrapped telescopic shaft 100 is formed by wrapping the two belt members 110 and 120. In FIG. 2, the outer shape of the second belt member 120 is drawn with a dashed line for convenience of illustration. The upper left of FIG. 2 shows a state before wrapping, and the upper right of FIG. 2 shows the overlap of the two belt members 110 and 120 in the wrapped state, expanded in a plane.

The spirally wrapped telescopic shaft 100 is formed by spirally wrapping the first belt member 110 and the second belt member 120 disposed inside the first belt member 110 around an axis line CX. The first belt member 110 has a first flat belt part 111 and a plurality of first engagement parts 112 aligned in a plurality of rows along a longitudinal direction of the first belt member 110. The first flat belt part 111 is a flat belt-like part with no protrusions or recesses. The first engagement parts 112 are aligned in two rows at regular intervals along the longitudinal direction of the first belt member 110. The second belt member 120 has a second flat belt part 121 and a plurality of second engagement parts 122 aligned in a plurality of rows along a longitudinal direction of the second belt member 120. The second flat belt part 121 is a flat belt-like part with no protrusions or recesses. The second engagement parts 122 are aligned in two rows at regular intervals along the longitudinal direction of the second belt member 120.

In the spirally wrapped telescopic shaft 100 shown at the bottom of FIG. 2, the first belt member 110 is wrapped at a constant pitch Pt along the axis line CX. A distance Le between the rows of the first engagement parts 112 of the two rows along the direction of the axis line CX is equal to ½ of the wrapping pitch Pt. The second belt member 120 also have configurations similar to those stated above.

The first belt member 110 has a width W1, and the second belt member 120 has a width W2. The widths W1 and W2 are approximately equal, and are set to values slightly smaller than the wrapping pitch Pt. The two belt members 110 and 120 are overlapped and spirally wrapped in a state in which they are displaced from each other by ½ of the wrapping pitch Pt. As a result, the first engagement parts 112 of the two rows of the first belt member 110 engage with the second engagement parts 122 of the two second belt members 120 overlapped inside the first belt member 110.

Figure 3A:
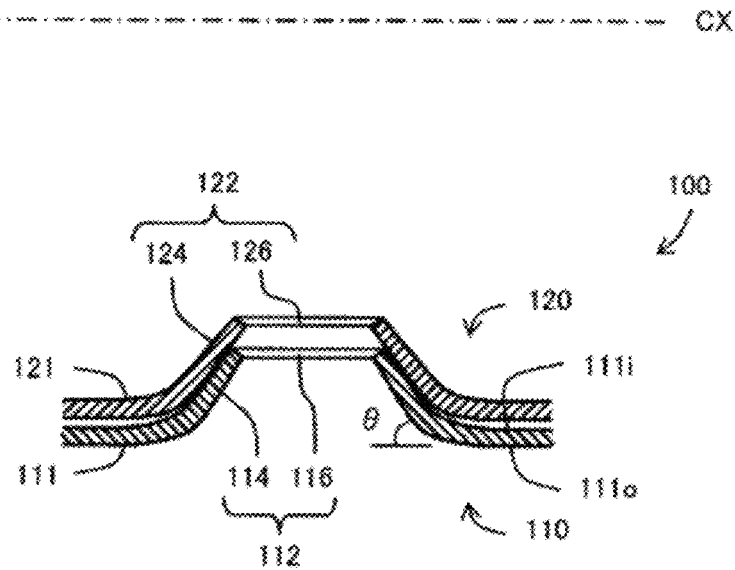
FIG. 3A is a cross-sectional view of a spirally wrapped telescopic shaft in a reference example.

FIG. 3A is a cross-sectional view of the spirally wrapped telescopic shaft 100 in the reference example. The first engagement parts 112 of the first belt member 110 are configured as first hollow protrusion parts 114 (hollow conical trapezoidal protrusion parts) projecting toward the axis line CX. The first engagement parts 112 each have an opening part 116 in its center. The opening part 116 may be omitted. That is, the tips of the first hollow protrusion parts 114 may be closed.

The second engagement parts 122 of the second belt member 120 are configured to fit to the first engagement parts 112 of the first belt member 110. In the reference example, the second engagement parts 122, like the first engagement parts 112, are also configured as second hollow protrusion parts 124 (hollow conical trapezoidal protrusion parts) projecting toward the axis line CX, and each have an opening part 126 in the center thereof. The opening part 126 may be omitted. That is, tips of the second hollow protrusion parts 124 may be closed.

The second engagement parts 122 may be configured to have almost the same shape as the first engagement parts 112, and the shape of the convex parts is preferably slightly larger than that of the first engagement parts 112.

The inner surface of the first hollow protrusion parts 114 and the outer surface of the second hollow protrusion parts 124 are configured to make face contact with each other. In this configuration, the contact pressure can be reduced compared to that in a case where the two engagement parts make point contact with each other. As a result, deformation due to contact can be reduced, and noise and vibration can be reduced.

An angle θ formed by the first hollow protrusion parts 114 and the first flat belt part 111 is preferably set in a range of 30° to 85°. The same goes for the second hollow protrusion parts 124.

The first engagement parts 112 project inward (on the side of the axis line CX) from an inner surface 111i of the first flat belt part 111. On the other hand, there is no part projecting outward from an outer surface 111o of the first flat belt part 111. The second belt member 120 also have configurations similar to those stated above.

Figure 3B:
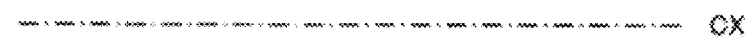
FIG. 3B is a cross-sectional view of a spirally wrapped telescopic shaft in a comparative example.

FIG. 3B is a cross-sectional view of a spirally wrapped telescopic shaft in a comparative example. In this comparative example, a first belt member 11 has a first flat belt part 12 and a solid engagement pin 14. The engagement pin 14 is welded to the first flat belt part 12, and a welding scar 16 projecting outside of the first flat belt part 12 is formed. A second belt member 21 has a second flat belt part 22 and an engagement hole 24.

In the spirally wrapped telescopic shaft of this comparative example, a large number of engagement pins 14 need to be joined to the first flat belt part 12, which increases the weight and cost of the first belt member 11.

On the other hand, in the spirally wrapped telescopic shaft 100 of the reference example shown in FIG. 3A, the first engagement parts 112 of the first belt member 110 are configured as hollow protrusion parts. Therefore, it is possible to provide a spirally wrapped telescopic shaft that is lighter and less expensive than that in a case where solid engagement pins are used.

The first hollow protrusion parts 114 can be molded, for example, by performing press forming on the first belt member 110 before the first hollow protrusion parts 114 are formed. The same goes for the second hollow protrusion parts 124.

As described above, in the above reference example, the first engagement parts 112 of the first belt member 110 are configured as the first hollow protrusion parts 114. Therefore, it is possible to provide a telescopic shaft that is lighter and less expensive than that in a case where solid engagement pins are used. In addition, since the first hollow protrusion parts 114 and the second hollow protrusion parts 124 are configured to make surface contact with each other, the contact pressure can be reduced compared to that in a case where the two engagement parts make point contact with each other. As a result, deformation due to contact can be reduced, and noise and vibration can be reduced.

Figure 3C:
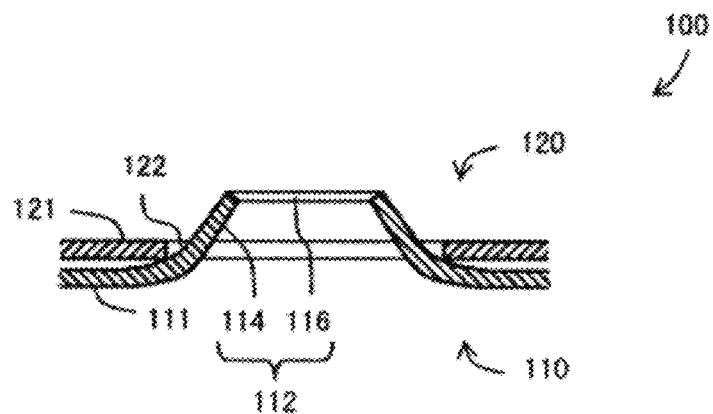
FIG. 3C is a diagram showing a modified example of second engagement parts 122.
Figure 3D:
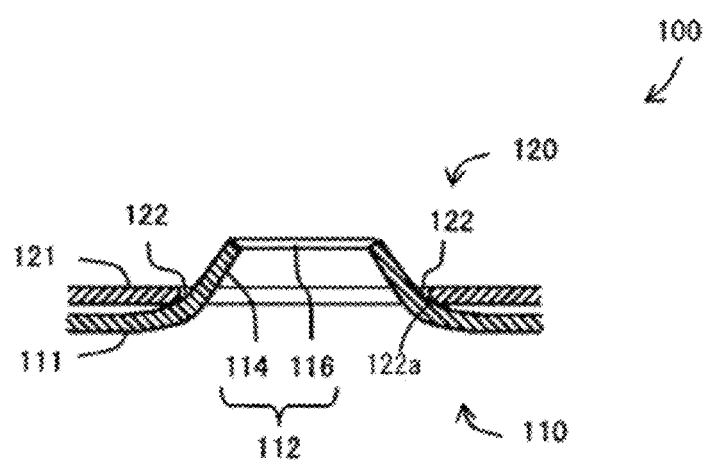
FIG. 3D is a diagram showing a modified example of the second engagement parts 122.

FIGS. 3C and 3D are diagrams showing a modified example of the second engagement parts 122. As shown in FIG. 3C, engagement holes (through-holes) formed in the second belt member 120 may be used as the second engagement parts 122 instead of the second hollow protrusion parts 124. In this case, as shown in FIG. 3D, peripheral edge parts 122a (engagement holes) of the second engagement parts 122 may be chamfered or may be subjected to R machining instead of being chamfered.

Embodiments

First, a problem found by the present inventors in the telescopic device 60 (spiral advancing and retreating operation device) of the above reference example will be explained.

As described above, in the above reference example, the telescopic device 60 (spiral advancing and retreating operation device) constitutes the spirally wrapped telescopic shaft 100 (an example of a tubular telescopic body of the present disclosure) by spirally wrapping the first belt member 110 (an example of a first belt member of the present disclosure) and the second belt member 120 (an example of a second belt member of the present disclosure) disposed inside the first belt member 110 around the common axis line CX in an overlapping manner in a state in which the first belt member 110 and the second belt member 120 are displaced from each other in the direction of the axis line CX (displaced from each other by half a width).

For example, the first belt member 110 of the above reference example includes the first row of engagement protrusions L1 and the second row of engagement protrusions L2 (see FIG. 2) constituted by the plurality of first hollow protrusion parts 114 (see FIG. 3A, an example of engagement protrusions of this disclosure, also referred to as engagement protrusions 114 below) that are disposed in the longitudinal direction and are convex toward the axis line CX.

On the other hand, the second belt member 120 of the above reference example includes the first row of engagement parts L3 and the second row of engagement parts L4 (see FIG. 2) constituted by the plurality of second engagement parts 122 (an example of engagement parts of the present disclosure) disposed in the longitudinal direction of the second belt member 120.

The second engagement parts 122 are configured in such a way that the engagement protrusions 114 can be detachably engaged therewith in a state in which the first belt member 110 and the second belt member 120 are spirally wrapped in an overlapping manner.

As described above, when the spirally wrapped telescopic shaft 100 is used, which is configured by spirally wrapping the first belt member 110 and the second belt member 120 disposed inside the first belt member 110 around the common axis line CX in an overlapping manner in a state in which the first belt member 110 and the second belt member 120 are displaced from each other in the direction of the axis line CX, there is a following problem.

This problem will be described below using a comparative example.

A comparative example is the spirally wrapped telescopic shaft (tubular telescopic body) disclosed in Japanese Patent No. 4607772. Hereinafter, this spirally wrapped telescopic shaft will be referred to as a spirally wrapped telescopic shaft 100A. In the spirally wrapped telescopic shaft 100A of the comparative example, the trapezoidal engagement pin 14 (see FIG. 3B) and the engagement hole 24 (see FIG. 3B) with which the engagement pin 14 can be detachably engaged are used as the engagement protrusions.

Figure 4:
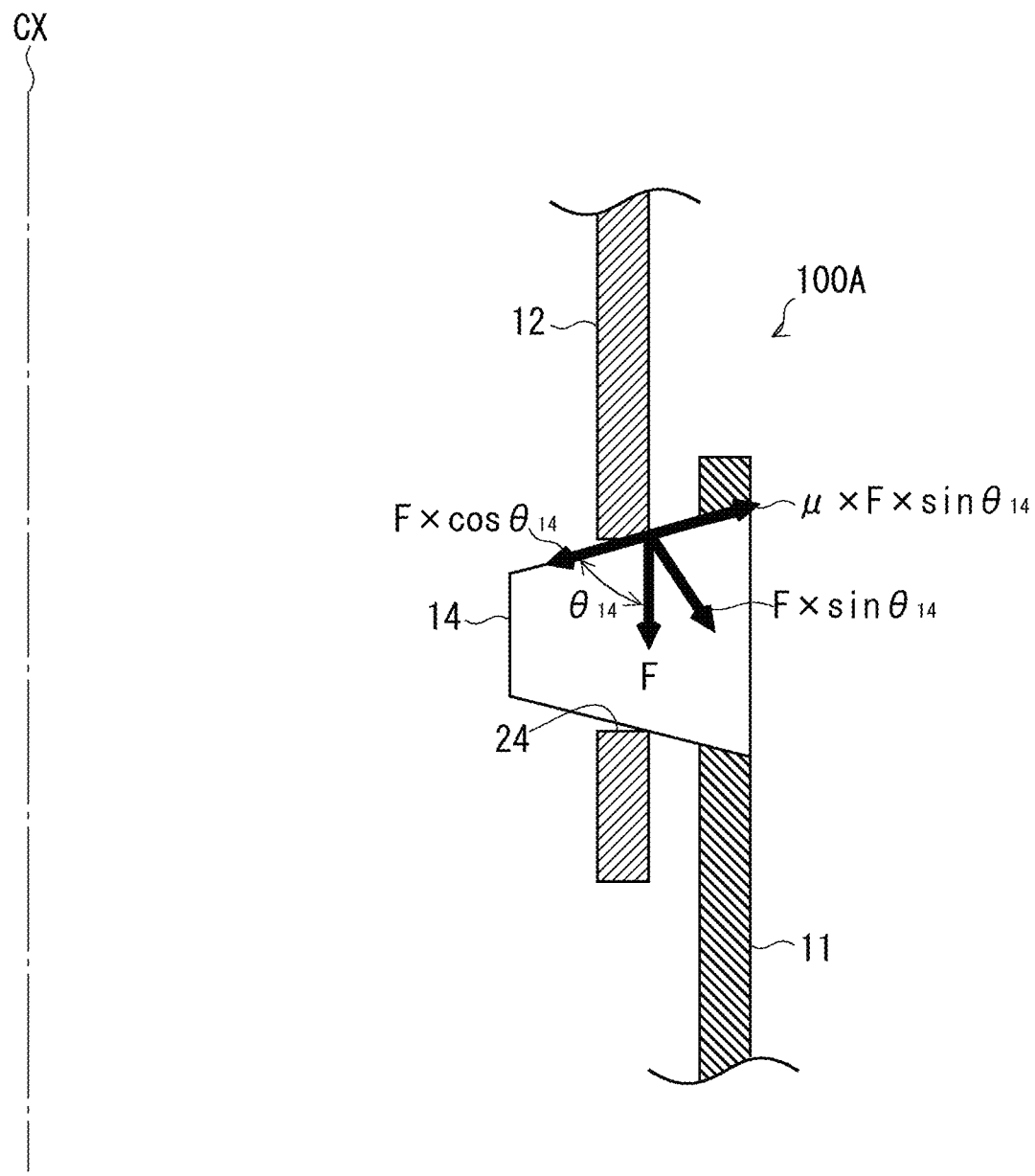
FIG. 4 is a diagram showing a force and so on acting on an engagement pin 14 when an external force is applied to a spirally wrapped telescopic shaft 100A.

FIG. 4 is a diagram showing a force and so on acting on the engagement pin 14 when an external force is applied to the spirally wrapped telescopic shaft 100A. In FIG. 4, a reference symbol F indicates a force acting on the engagement pin 14 when an external force is applied to the spirally wrapped telescopic shaft 100A. The case where an external force is applied to the spirally wrapped telescopic shaft 100A is, for example, a case where an eccentric load is applied to the spirally wrapped telescopic shaft 100A by placing a heavy object on the top of the spirally wrapped telescopic shaft 100A at a position horizontally shifted from the central axis. An angle $\theta_{14}$ represents a pin angle (tilt angle) of the engagement pin 14. The pin angle (tilt angle) is the angle formed between the bottom surface and the side surface (outer peripheral surface) of the engagement pin 14. Hereinafter, the angle $\theta_{14}$ will also be referred to as a tilt angle $\theta_{14}$. $F \times \cos \theta_{14}$ represents a force to disengage the engagement pin 14 from the engagement hole 24. $F \times \cos \theta_{14}$ becomes larger as the tilt angle $\theta_{14}$ becomes smaller. $\mu \times F \times \sin \theta_{14}$ represents a resistance force (friction force) determined by the tilt angle $\theta_{14}$ and a friction coefficient $\mu$ of the engagement pin 14.

In FIG. 4, when the relationship $F \times \cos \theta_{14} > \mu \times F \times \sin \theta_{14}$ is established, sliding occurs between the engagement pin 14 and the engagement hole 24. In this case, if the tilt angle $\theta_{14}$ is small, the engagement pin 14 and the engagement hole 24 become disengaged from each other even when a small external force is applied to the spirally wrapped telescopic shaft 100A. That is, if the tilt angle $\theta_{14}$ is small, rigidity of the spirally wrapped telescopic shaft 100A decreases.

If the tilt angle $\theta_{14}$ is increased (for example, tilt angle $\theta_{14}=90°$), the difficulty of disengagement between the engagement pin 14 and the engagement hole 24 when an external force is applied increases (in other words, load-bearing capacity in the vertical direction is improved). The vertical direction refers to the direction of the axis line CX of the spirally wrapped telescopic shaft 100A. On the other hand, if the tilt angle $\theta_{14}$ is increased (for example, tilt angle $\theta_{14}=90°$), when the first belt member 110 and the second belt member 120 are spirally wrapped in an overlapping manner as described above, the tip of the engagement pin 14 tends to interfere with the engagement hole 24 (around the engagement hole 24). As a result, it becomes difficult for the first belt member 110 and the second belt member 120 to be spirally wrapped correctly in an overlapping manner (that is, the wrapping ability in the circumferential direction is reduced). The circumferential direction means a circumferential direction of the spirally wrapped telescopic shaft 100A.

As described above, when conical trapezoidal engagement protrusions (for example, engagement pins 14) are used as engagement protrusions, there is a trade-off between the load-bearing capacity in the vertical direction and the wrapping ability of the circumferential direction, so there is a problem that it is impossible to make both the load-bearing capacity in the vertical direction and the wrapping ability of the circumferential direction high.

Next, a configuration example for solving the above problem will be described as an embodiment.

This configuration example can be applied also to the spirally wrapped telescopic shaft 100 using the engagement pin 14 (see FIG. 3B) of the above comparative example, the spirally wrapped telescopic shaft 100 using the first hollow protrusion part 114 (hollow conical trapezoidal protrusion part, see FIG. 3A) of the above reference example, and a spirally wrapped telescopic shaft 100 using another engagement protrusion. A representative example of applying this configuration example to the spirally wrapped telescopic shaft 100 using the engagement pin 14 of the above comparative example will be described below.

Figure 5A:
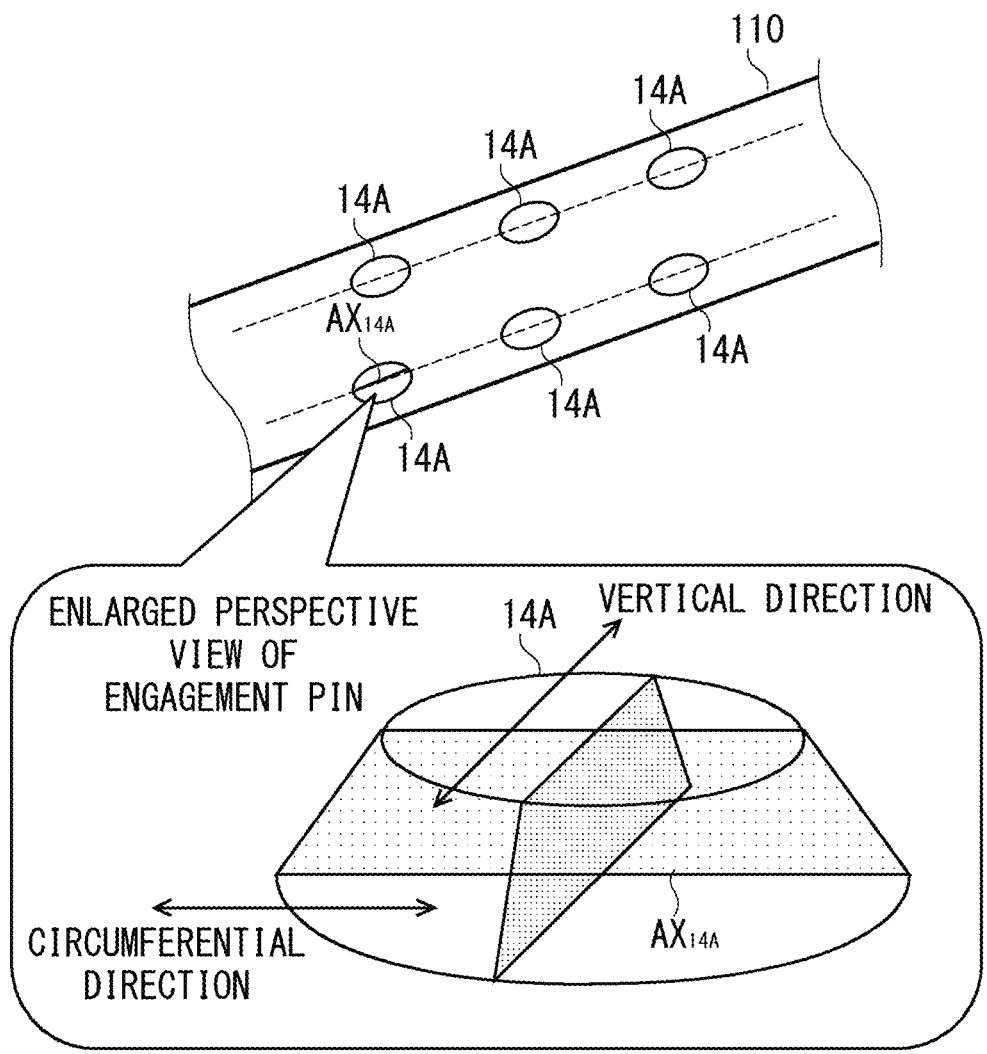
FIG. 5A is a plan view of a first belt member 110 with the engagement pin 14A of the embodiment.
Figure 5B:
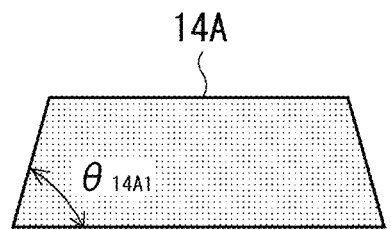
FIG. 5B is a cross-sectional view of the engagement pin 14A in a plane including a vertical direction (direction of an axis line CX)
Figure 5C:
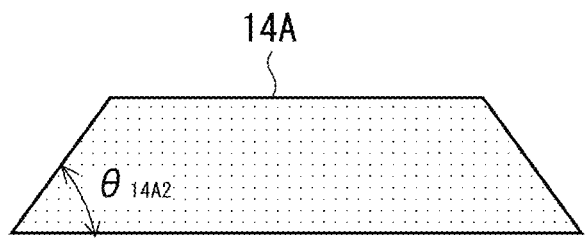
FIG. 5C is a cross-sectional view of the engagement pin 14A in a plane including a circumferential direction.

FIG. 5A is a plan view of a first belt member 110 provided with engagement pins 14A of the embodiment, FIG. 5B is a cross-sectional view of the engagement pin 14A in a plane including the vertical direction (direction of the axis line CX), and FIG. 5C is a cross-sectional view of the engagement pin 14A in a plane including the circumferential direction.

As shown in FIG. 5A, the engagement pin of this embodiment (hereinafter referred to as the engagement pin 14A) is not a conical trapezoidal shape, but an elliptical trapezoidal engagement protrusion having tilt angles different from each other in the vertical direction (direction of the axis line CX) and the circumferential direction. Specifically, a tilt angle $\theta_{14A1}$ (see FIG. 5B) of the engagement pin 14A in the cross section of the plane including the vertical direction is larger than a tilt angle $\theta_{14A2}$ (see FIG. 5C) of the engagement pin 14A in the cross section of the plane including the circumferential direction. The tilt angle $\theta_{14A1}$ is preferably 70 to 90° in consideration of the load-bearing capacity in the vertical direction. On the other hand, the tilt angle $\theta_{14A2}$ is preferably smaller (about 70° or smaller) than the tilt angle $\theta_{14A1}$ in consideration of the wrapping property of the circumferential direction (however, it depends on the diameter of the spirally wrapped telescopic shaft 100 and the height of the engagement pin 14A).

The engagement pin 14A is provided in the first belt member 110 in a state in which the upper surface of the engagement pin 14A faces the axis line CX and its long axis $AX_{14A}$ (see FIG. 5A) is in line with the longitudinal direction of the first belt member 110. In this way, the tilt angle $\theta_{14}$ in the wrapping direction becomes the gentlest, thereby improving the wrapping property.

On the other hand, although not shown, the engagement hole (hereinafter, engagement hole 24A) engaged by the engagement pin 14A is not a circular hole but an elliptical engagement hole (through-hole) corresponding to the engagement pin 14A. The engagement hole 24A is provided in the second belt member 120 in a state in which the long axis of the engagement hole 24A is in line with the longitudinal direction of the second belt member 120.

According to the above configuration of the engagement pin 14A, the tilt angle $\theta_{14A1}$ (see FIG. 5B) of the engagement pin 14A in the cross section of the plane including the vertical direction can be made larger than the tilt angle $\theta_{14A2}$ (see FIG. 5C) of the engagement pin 14A in the cross section of the plane including the circumferential direction. Thus, the rigidity (load-bearing capacity in the vertical direction) of the spirally wrapped telescopic shaft 100 can be improved.

Conversely, according to the above configuration of the engagement pin 14A, the tilt angle $\theta_{14A2}$ (see FIG. 5C) of the engagement pin 14A in the cross section of the plane including the circumferential direction can be made smaller than the tilt angle $\theta_{14A1}$ (see FIG. 5B) of the engagement pin 14A in the cross section of the plane including the vertical direction. This makes it possible to improve the wrapping ability (ease of wrapping) of the belt member (in particular, the first belt member 110).

As described above, with the elliptical trapezoidal engagement protrusion (for example, engagement pin 14A), both rigidity (load-bearing capacity in the vertical direction) of the spirally wrapped telescopic shaft 100 and the wrapping ability (ease of wrapping) of the belt member (in particular, the first belt member 110) can be made high.

As described above, according to this embodiment, both rigidity (load-bearing capacity in the vertical direction) of the spirally wrapped telescopic shaft 100 and the wrapping ability (ease of wrapping) of the belt member (in particular, the first belt member 110) can be made high. This is because the tilt angle $\theta_{14A1}$ (see FIG. 5B) of the engagement protrusion (for example, engagement pin 14A) in the cross section of the plane including the vertical direction is made larger than the tilt angle $\theta_{14A2}$ (see FIG. 5C) of the engagement protrusion (for example, engagement pin 14A) in the cross section of the plane including the circumferential direction of the spirally wrapped telescopic shaft 100. That is, for the force in the vertical direction, the friction force (see ×F×sin $\mu\theta_{14}$ in FIG. 4) can be increased because the engagement hole 24 contacts the engagement protrusion (for example, engagement pin 14A) at a steeper angle (larger tilt angle $\theta_{14}$), and consequently the axial rigidity of the spirally wrapped telescopic shaft 100 can be increased. On the other hand, regarding the circumferential direction, by reducing the tilt angle (by decreasing the tilt angle $\theta_{14}$), it is possible to contribute to smoother wrapping.

Next, a modified example will be described.

FIGS. 6A-6D are explanatory views of a modified example of the engagement protrusion (for example, engagement pin 14A).

Figure 6A:
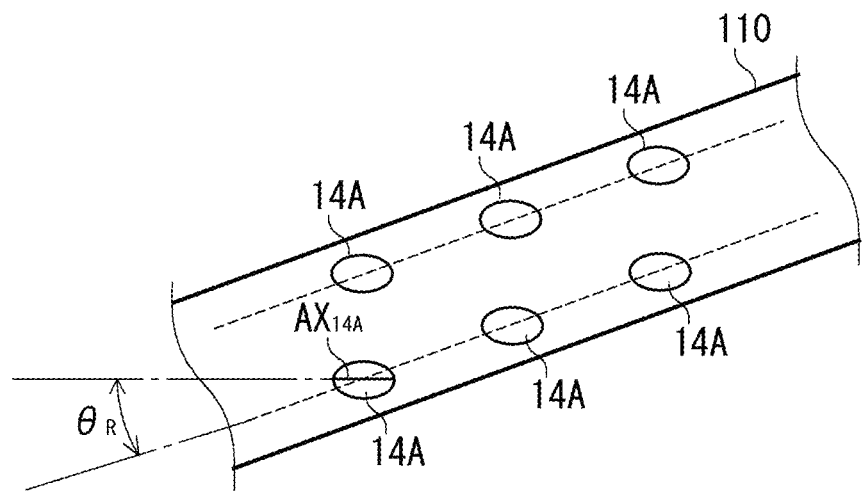
FIG. 6A is an explanatory view of a modified example of the engagement protrusion (for example, engagement pin 14A)

In the above embodiment, an elliptical trapezoidal engagement protrusion (for example, engagement pin 14A) is provided in the first belt member 110 in a state in which the long axis $AX_{14A}$ of the elliptical trapezoidal engagement protrusion (see FIG. 5A) is in line with the longitudinal direction of the first belt member 110, but this is merely one example. For example, as shown in FIG. 6A, the elliptical trapezoidal engagement protrusion (for example, engagement pin 14A) may be provided in the first belt member 110 in a state in which the long axis $AX_{14A}$ of the elliptical trapezoidal engagement protrusion is tilted by a predetermined angle $\theta_R$ with respect to the longitudinal direction of the first belt member 110. The predetermined angle $\theta_R$ is, for example, a wrapping lead angle (see FIGS. 2 and 6A). In this way, since the tilt angle $\theta_{14A1}$ in the vertical direction is the steepest, the axial rigidity of the spirally wrapped telescopic shaft 100 can be increased. When the elliptical trapezoidal engagement protrusion (for example, engagement pin 14A) is provided in a state in which it is tilted by the predetermined angle $\theta_R$, the engagement hole 24A is also provided in the second belt member 120 in a state in which the long axis of the engagement hole 24A is tilted by the predetermined angle $\theta_R$ with respect to the longitudinal direction of the second belt member 120, although not shown.

Figure 6B:
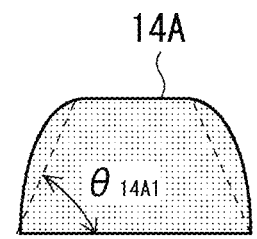
FIG. 6B is an explanatory view of a modified example of the engagement protrusion (for example, engagement pin 14A)
Figure 6C:
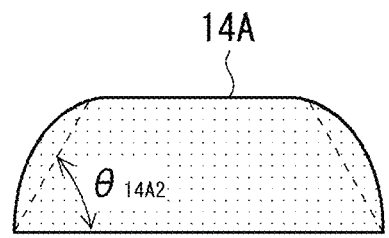
FIG. 6C is an explanatory view of a modified example of the engagement protrusion (for example, engagement pin 14A)

In the above embodiment, an example in which the shape of the engagement protrusion (for example, engagement pin 14) is not a conical trapezoidal shape but an elliptical trapezoidal shape has been described, but the elliptical trapezoidal shape may not be a mathematically complete elliptical trapezoidal shape. For example, as shown in FIGS. 6B and 6C, side surfaces (outer peripheral surfaces) of the engagement protrusion (for example, engagement pin 14A) may not have a straight line shape but may have an arc shape (a burring shape) that bulges outward (or inward) with respect to side surfaces (outer peripheral surfaces) of the reference elliptical trapezoidal shape. In FIGS. 6B and 6C, dotted lines represent the side surfaces (outer peripheral surfaces) of the reference elliptical trapezoidal shape.

Figure 6D:
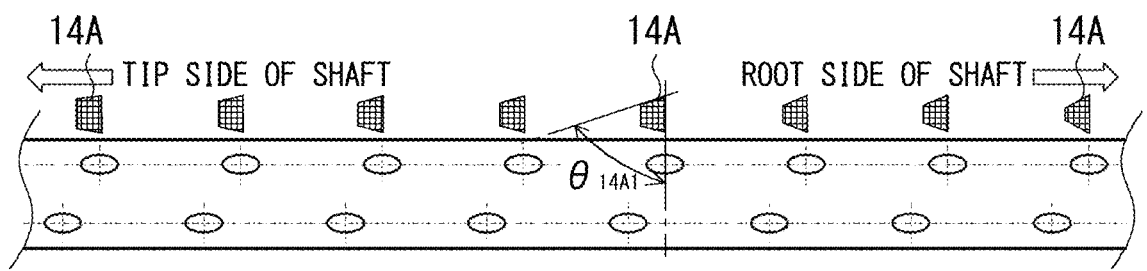
FIG. 6D is an explanatory view of a modified example of the engagement protrusion (for example, engagement pin 14A).

As shown in FIG. 6D, regarding the tilt angles $\theta_{14A1}$ of the engagement protrusions (for example, engagement pins 14A) in the cross section of the plane including the vertical direction, the tilt angle $\theta_{14A1}$ of an engagement protrusion (for example, an engagement pin 14A) closer to the proximal end side (root side) of the spirally wrapped telescopic shaft 100 may be made smaller, whereas the tilt angle $\theta_{14A1}$ of an engagement protrusion (for example, an engagement pin 14A) closer to the distal end side of the spirally wrapped telescopic shaft 100 may be made larger. In this way, when the spirally wrapped telescopic shaft 100 is deflected as an external force is applied to the spirally wrapped telescopic shaft 100 and the distal end of the spirally wrapped telescopic shaft 100 is displaced relative to the proximal end, the amount of deflection can be reduced.

The numerical values shown in the above embodiment are all examples, and it is needless to say that other appropriate numerical values may be used.

The foregoing embodiment is merely illustrative in every respect. The description of the foregoing embodiment is not intended to be a limited interpretation of the present disclosure. The present disclosure may be implemented in various other forms without departing from its spirit or principal features.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A spiral advancing and retreating operation device, comprising:
  a first belt member; and
  a second belt member,
  wherein
    the first and second belt members form a tubular telescopic body by spirally wrapping the first belt member and the second belt member disposed inside the first belt member around a common axis line in an overlapping manner in a state in which the first belt member and the second belt member are displaced from each other in a direction of the axis line, the first belt member comprises a first row of engagement protrusions and a second row of engagement protrusions formed of a plurality of engagement protrusions that are disposed in a longitudinal direction of the first belt member and are convex toward the axis line, the second belt member comprises a first row of engagement parts and a second row of engagement parts formed of a plurality of engagement parts disposed in a longitudinal direction of the second belt member, the engagement parts are configured in such a way that the engagement protrusions can be detachably engaged therewith in a state in which the first belt member and the second belt member are spirally wrapped in the overlapping manner, the engagement protrusions are elliptical trapezoidal protrusions, and each engagement protrusion of the engagement protrusions has:
- a bottom and a side,
- a first tilt angle which is defined between the bottom and the side of the engagement protrusion in a cross section of a first plane including the direction of the axis line, and
- a second tilt angle which is defined between the bottom and the side of the engagement protrusion in a cross section of a second plane including a circumferential direction of the tubular telescopic body, wherein
  the first tilt angle of the engagement protrusion is larger than the second tilt angle of the engagement protrusion.

2. The spiral advancing and retreating operation device according to claim 1, wherein the engagement protrusions are provided in the first belt member in a state in which a long axis of each of the engagement protrusions is in line with the longitudinal direction of the first belt member.

3. The spiral advancing and retreating operation device according to claim 2, wherein the second plane is perpendicular to the first plane.

4. The spiral advancing and retreating operation device according to claim 3, wherein the first plane and second plane include an axis of the engagement protrusion, and the axis of the engagement protrusion is perpendicular to both the direction of the axis line and the circumferential direction of the tubular telescopic body.

5. The spiral advancing and retreating operation device according to claim 4, wherein each of the engagement parts is an elliptical engagement through-hole.

6. The spiral advancing and retreating operation device according to claim 5, wherein the elliptical engagement through-hole has a long axis in line with the longitudinal direction of the second belt member.

7. The spiral advancing and retreating operation device according to claim 1, wherein the engagement protrusions are provided in the first belt member in a state in which a long axis of each of the engagement protrusions is tilted by a predetermined angle with respect to the longitudinal direction of the first belt member.

8. The spiral advancing and retreating operation device according to claim 7, wherein the second plane is perpendicular to the first plane.

9. The spiral advancing and retreating operation device according to claim 8, wherein the first plane and second plane include an axis of the engagement protrusion, and the axis of the engagement protrusion is perpendicular to both the direction of the axis line and the circumferential direction of the tubular telescopic body.

10. The spiral advancing and retreating operation device according to claim 9, wherein each of the engagement parts is an elliptical engagement through-hole.

11. The spiral advancing and retreating operation device according to claim 10, wherein the elliptical engagement through-hole has a long axis tilted by the predetermined angle with respect to the longitudinal direction of the second belt member.

* * * * *